United States Patent [19]

Solow

[11] Patent Number: 4,747,279

[45] Date of Patent: May 31, 1988

[54] AUTOMOBILE SECURITY DEVICE FOR LOCKING A FLOOR-MOUNTED GEARSHIFT LEVER

[75] Inventor: Stanley E. Solow, Plainview, N.Y.

[73] Assignee: Wolo Manufacturing Corp., Deer Park, N.Y.

[21] Appl. No.: 46,529

[22] Filed: May 4, 1987

[51] Int. Cl.$^4$ .............................................. B60R 25/00
[52] U.S. Cl. ...................................... 70/238; 70/199; 70/211
[58] Field of Search ................. 70/198, 199, 200, 209, 70/210, 211, 212, 226, 225, 237, 238, 247, 254

[56] References Cited

U.S. PATENT DOCUMENTS 1,364,539  1/1921  Baker .................................... 70/199

FOREIGN PATENT DOCUMENTS 106072  12/1966  Denmark ............................. 70/209
1269513  4/1972  United Kingdom .................. 70/238
1554593  10/1979  United Kingdom .................. 70/238

Primary Examiner—Robert L. Wolfe
Attorney, Agent, or Firm—Brumbaugh, Graves, Donohue & Raymond

[57] ABSTRACT

An automobile security device includes a lock bar extending through a lock housing. A clamping device is fixed on one end of the lock bar, and a hook is supported by the lock housing. The lock housing and hook are axially displaceable along the lock bar, such that the clamp can be attached to a floor mounted gear select lever or gearshift lever, and the lock housing and hook thereafter moved axially along the lock bar, away from the clamp, until the hook engages the floor mounted brake handle. The lock housing is locked on the lock bar, after the unit is mounted, so as to prevent the movement of the gear select lever out of the park position, and prevent movement of the brake from the engaged to the release position. The unit may also be mounted on a steering wheel, and includes a projecting rod to interfere with the rotation of the steering wheel.

4 Claims, 1 Drawing Sheet

AUTOMOBILE SECURITY DEVICE FOR LOCKING A FLOOR-MOUNTED GEARSHIFT LEVER

FIELD OF INVENTION

The present invention relates to automobile security devices designed to deter automobile theft.

BACKGROUND OF THE INVENTION

Original manufacturers provide protection against theft of their automobiles through the use of an ignition lock. However, it is relatively easy for a professional thief to defeat an ignition lock by using a master key or a tool for forceably removing the lock, such as a dent puller. Accordingly, ignition locks in themselves offer relatively little protection, and automobile theft continues to be a major problem in the United States, especially in larger cities.

In most American automobiles, the ignition lock is mounted on the steering column. In automobiles having such an arrangement, it is possible to provide effective protection of the ignition lock using a device such as the Auto Watchman, which is manufactured by the assignee of the present application, Wolo Manufacturing Corporation, and is described in U.S. Pat. No. 4,494,391. But, in many automobiles, especially foreign makes, the ignition lock is mounted on or adjacent the dashboard, and thus cannot be protected in this manner.

Commonly owned U.S. Pat. No. 4,658,613 discloses another ignition lock protector that additionally includes a lock bar which engages the gearshift lever in cars with a column-mounted gearshift. This device not only protects the ignition lock from tampering, but prevents the gear shift lever from being moved out of the "park" position (or the parking gear, in a standard transmission).

A number of other types of theft-deterrent accessory devices, that do not require a steering column-mounted ignition lock or column-mounted gearshift lever, have been proposed. But, many of these devices are of limited value. It would be desirable, therefore, to provide an effective deterrent against car theft for cars that do not have steering-column-mounted ignition locks and further do not have column-mounted gearshift levers.

SUMMARY OF THE INVENTION

The present invention is an automobile security device that will provide an effective deterrent to car theft in automobiles of the type that have a floor mounted gear select or gearshift lever. Such device is easy to install, and difficult to bypass, even for a professional car thief.

More particularly, an automobile security device in accordance with the invention includes a lock housing having a hole, a lock bar extending through the hole and being moveable along its axis, relative to the housing. A lock is mounted in the housing which selectively engages the lock bar at axially spaced locations. A clamp is fixed on one end of the lock bar which is sized to engage the shaft of the gear shift lever. A hook is supported by the lock housing, and sized appropriately to engage the floor mounted brake handle.

The device may be installed by attaching the clamp to the gear select lever (or the gearshift lever in a standard transmission), preferably near its upper end, and thereafter pulling the housing and hook along the lock bar, away from the clamp, until the hook engages the base of the floor mounted brake handle. Once in position, the lock is actuated to secure the housing on the lock bar, and prevent the gear select lever from being moved out of the "park" position (or prevent the gearshift from being moved out of the parking gear).

Preferably, the clamp includes a lockable jaw that can be swung open for positioning the device about the gearshift lever and thereafter closed and locked around the gearshift lever shaft. If desired, the hook may be rotatably mounted relative to the housing to facilitate mounting about the brake handle.

In an alternative embodiment, a shaft projects from the lock housing, the shaft being co-axial with the lock bar. In this manner, the device may be used in an alternative mounting, on the steering wheel, with the clamp and hook engaging opposite sides of the wheel. The shaft extends a distance sufficient to interfere with turning the steering wheel, so as to effectively prevent the car from being driven. This would provide an optional use of the security device in cars that do not include a floor mounted gearshift lever.

For a better understanding of the invention, reference is made to the following detailed description of the preferred embodiments, taken in conjunction with the drawings accompanying the application.

DETAILED DESCRIPTION OF THE PREFERRED EMBODIMENTS

Figure 1:
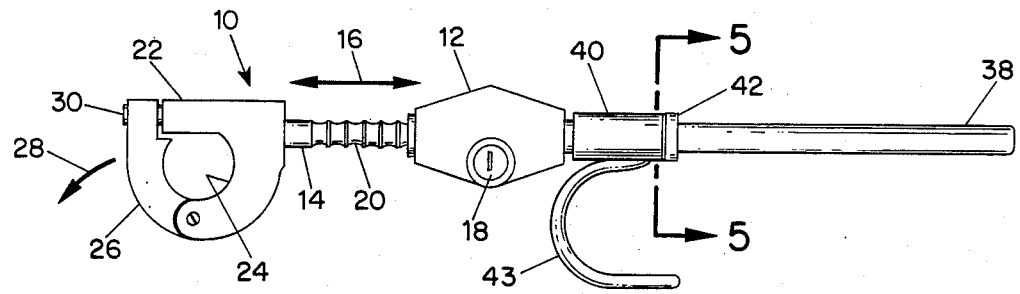
FIG. 1 is a top view of an automobile security device according to the invention.

An automobile security device 10 according to the invention includes a lock housing 12 and a lock bar 14. The lock bar 14 extends axially through a hole in the lock housing 12, and is displaceable along its axis relative to the lock housing 12, as shown by arrow 16. The lock housing 12 includes a lock 18 with a member that may be moved selectively into and out of engagement with the lock bar 14, for locking the axial position of the bar 14. As shown in FIG. 1, the bar 14 includes axially spaced grooves 20. The member actuated by lock 18 selectively engages one of the grooves 20. Lock bars 14 having grooves 20, that are slideably received in a lock housing such as housing 12 containing a lock 18, are used in known devices such as the Wolo model WB-10 steering wheel-brake pedal lock and need not be described further here.

Figure 6:
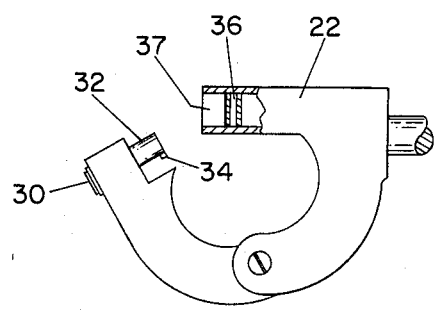
FIG. 6 is a view of the clamp portion of FIG. 1, shown in its open position.

A clamp 22 (which is itself a known type) is fixed on one end of the lock bar 14 and includes a hole 24 suitable for engaging the shaft of a gear shift lever. Preferably, the clamp 22 includes a moveable jaw 26 that can be opened, as shown by arrow 28 and by FIG. 6, and can be selectively closed and locked with a lock. As shown in FIG. 6, lock 30 rotates a shaft 32, containing a dog 34 which may be rotated into and out of locking position with a corresponding projection 36 inside the lock receiving portion 37.

Referring again to FIG. 1, a rod 38 is fixed on the housing 12 and extends in a direction coaxial with, and opposite to, the lock bar 14. The rod 38 is preferably of hollow tubular construction so that the end of the lock bar 14 can move axially freely inside the rod 38, as shown in FIG. 5.

Figure 5:
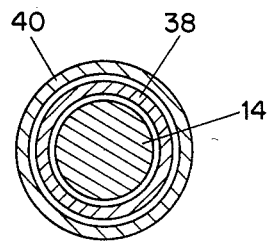
FIG. 5 is a sectional view, taken through lines 5—5 of FIG. 1, showing the mounting of the hook element relative to the lock housing.

A cylindrical sleeve 40 is rotatably supported relative to the housing 12, about the rod 38 (see FIG. 5). An end stop 42 is welded or otherwise fixed on the rod 38 to limit the axial movement of the sleeve 40. A hook element 43 extends from the sleeve 40, so that the sleeve 40 and hook 43 assembly is rotatable about the axis of the bar 14.

It should be evident that, with the device shown in FIG. 1, when the lock 18 is not engaged, the clamp 22 may be moved axially toward and away from the lock housing 12 and hook 43, and thus it is possible to adjust the length of the device. When the lock 18 is engaged, however, the axial distance between the clamp 22 and hook 43 is fixed.

Figure 2:
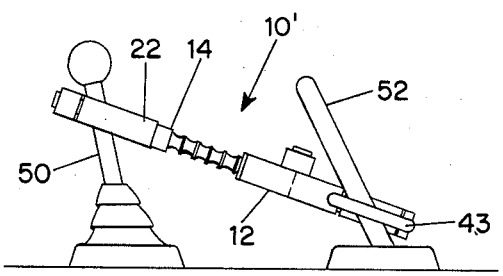
FIGS. 2 and 3 are side and top views, respectively, of a modified form of the FIG. 1 device, shown mounted in a car that has a floor mounted gear select lever and a floor mounted brake handle.
Figure 3:
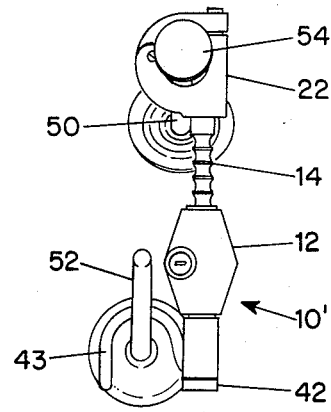

FIGS. 2 and 3 illustrate a floor-mounted gear select lever 50 and a floor mounted emergency or parking brake handle 52. Both the lever 50 and brake handle 52 have conventional cylindrical shaft configurations, and the gear shift lever 50 is further provided with an upper cross bar 54. The gear select lever 50 is shown in the "park" position, which is its forward-most position. The brake handle 52 is shown in its upraised position, which corresponds to its position for parking the car.

The security device 10' shown in FIGS. 2 and 3 is identical with that shown in FIG. 1, except that the rod 38 terminates at the end stop 42, rather than projecting ourwardly as shown in FIG. 1. However, the device as shown in FIG. 1 may be employed in the mounting shown in FIGS. 2 and 3.

In order to mount the device 10', the gear select lever 50 and brake handle 52 are moved to their parking positions, as shown in FIG. 2. With the lock 30 disengaged and the jaw 26 swung to the open position, the clamp 22 is positioned around the shaft of the gear shift lever, preferably near its upper end, and the jaw 26 is closed and locked. With the lock 18 in the disengaged position, the housing 12 and hook 42 are pulled axially along the lock bar 14, until the hook engages the base of the brake handle 52. Once the unit is snuggly in position, the lock 18 is engaged.

Because of the relative geometry of the gear select lever 50 and brake handle 52, once the lock 18 is engaged, the gear select lever 50 cannot be moved toward the floor mounted brake handle 52. Thus, the car cannot be moved out of the park position. Similarly, even the brake 52 cannot be released, since the hook substantially prevents its movement to the release (down) position.

Figure 4:
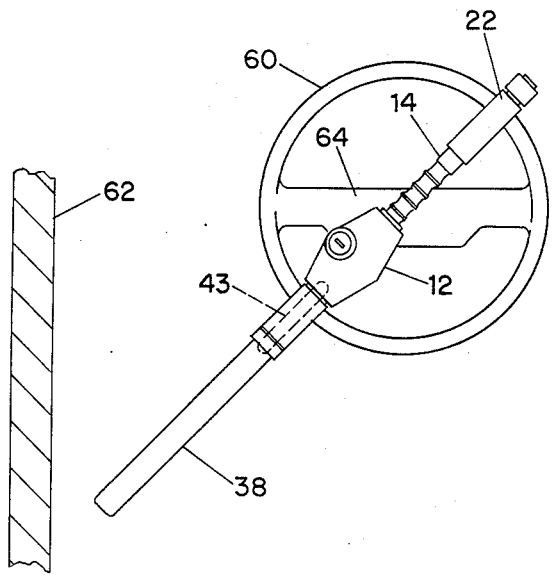
FIG. 4 is a front view of the device shown in FIG. 1, mounted on an automobile steering wheel.

FIG. 4 shows an alternative mounting arrangement, which utilizes the elongated rod extension 38 as shown in FIG. 1. FIG. 4 illustrates an automobile steering wheel 60, as well as a portion of the driver side door 62. In the FIG. 4 mounting, the clamp 22 is positioned to engage one side of the steering wheel, by opening and closing jaw 26 as described above. With lock 18 released, the housing 12 and hook are moved away from the clamp 22, until the hook engages the other side of the steering wheel 60, whereafter the lock 18 is engaged. In this position, the rod 38 projects a substantial distance away from the steering wheel 60, and if the steering wheel 60 is turned, the rod 38 will engage the side door 60 (or other portions of the automobile interior, depending upon how the unit is mounted). In any event, the device will effectively prevent driving the car. Even if the unit is slightly loose, it cannot be taken off the steering wheel, and rotation of the steering wheel 60 will eventually cause the cross bar 64 to engage the clamp 22 and hook 42.

The foregoing represents a description of the preferred embodiments of the invention. Variations and modifications of the embodiment shown and described will be apparent to persons skilled in the art, without departing from the inventive concepts disclosed herein. For example, while the device is described for use with a gear select lever 50 that can be put in "park", i.e. an automatic transmission, the device will work also with a floor mounted gearshift lever of a standard transmission. In this case, the gearshift lever is pushed forward into gear, and the security device prevents the hand brake from being released and the gearshift lever from being moved out of gear, e.g. into neutral or other gears. All such modifications and variations are intended to be within the scope of the present invention as defined in the following claims.

I claim:

1. An automobile security device for use with a floor-mounted hand brake, having a handle that extends from a base, and gear select lever or gearshift lever, said device comprising:

a lock housing having a hole therethrough;

a lock bar extending through the hole and being displaceable, along its axis, relative to the lock housing, the lock bar having a free end spaced from said housing;

lock means associated with the lock housing for selectively engaging said lock bar at axially spaced locations;

first engagement means fixed on said free end of said lock bar, said means including a first recess means, for engaging a first generally cylindrical member; and second engagement means supported by the lock housing including a second recess means for engaging a second generally cylindrical member, wherein said first and second recess means face away from one another, in axially opposite directions, and wherein said first engagement means and second engagement means define opposite ends of the security device, whereby in a car that has a floor-mounted gear select lever or gearshift level and a floor-mounted brake handle, the first engagement means can be positioned to engage the shift lever, the housing and second engagement means pulled along the lock bar, away from the first engagement means, until the second engagement means engages the base of the floor mounted brake handle, and the lock means thereafter locked so that the gearshift lever cannot be moved toward the brake handle.

2. An automobile security device as claimed in claim 1, wherein the first engagement means comprises clamping means that includes a clamp element having a jaw moveable between an open position and a closed position defining a closed cylindrical space, and means for locking the jaw in the closed position, and wherein the second engagement means comprises a hook.

3. An automobile security device for use with a floor-mounted hand brake, having a handle that extends from a base, and a floor-mounted gear-select lever or gearshift lever, said device comprising:

- a telescoping rod and lock assembly, said rod being axially displaceable relative to said lock, and having a free end spaced from the lock;
- an elongated member axially fixed to said lock, said member and rod projecting axially from said lock in opposite directions, said elongated member having a free end;
- a hook mounted on said elongated member, said hook defining an opening facing away from the lock housing, said hook terminating in a free end substantially coextensive with the free end of the elongated member; and
- an engagement member fixed on the free end of the telescoping rod, the engagement member having a recess facing axially away from the rod and lock shaped to receive a lever extending generally perpendicular to the telescoping rod; whereby said device can be positioned so as to extend between the hand brake base and the gearshift or gear select lever, and the telescoping rod extended such that the hook and engagement members snugly engage the hand brake and lever, respectively, to lock them in place.

4. A method for securing an automobile of the type having a floor-mounted hand brake, with a handle that extends from a base and is pulled upwardly into a locked position, and a floor-mounted gearshift or gear-select lever moveable toward and away from the brake handle, comprising that steps of:

(a) providing a device having a telescoping rod and lock assembly, with first and second engagement means located at opposite ends of the device, mounted to the rod and lock respectively, wherein each engagement means has a recess, the recesses facing axially away from each other;

(b) moving the brake handle to a locked position and the lever to forward position away from the brake handle;

(c) positioning the device between the hand brake base and lever;

(d) extending the rod so that respective recesses engage the lever and brake handle, in the vicinity of the base; and (e) locking the telescoping rod against axial movement.

* * * * *